Sept. 25, 1962
P. JEPSON
3,055,562
LIQUID SEPARATOR
Filed Oct. 19, 1960
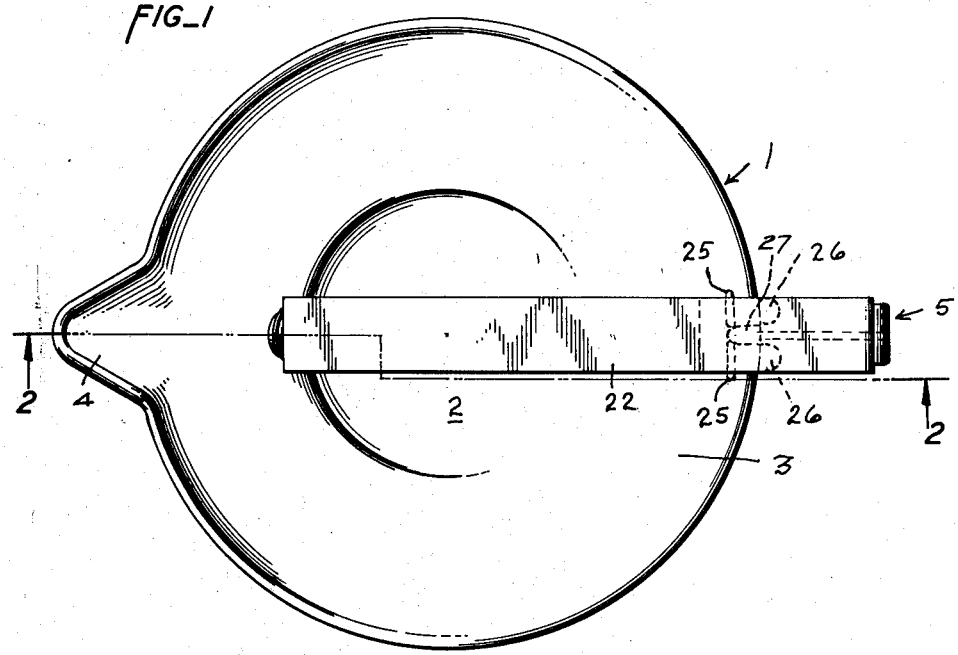
FIG_1
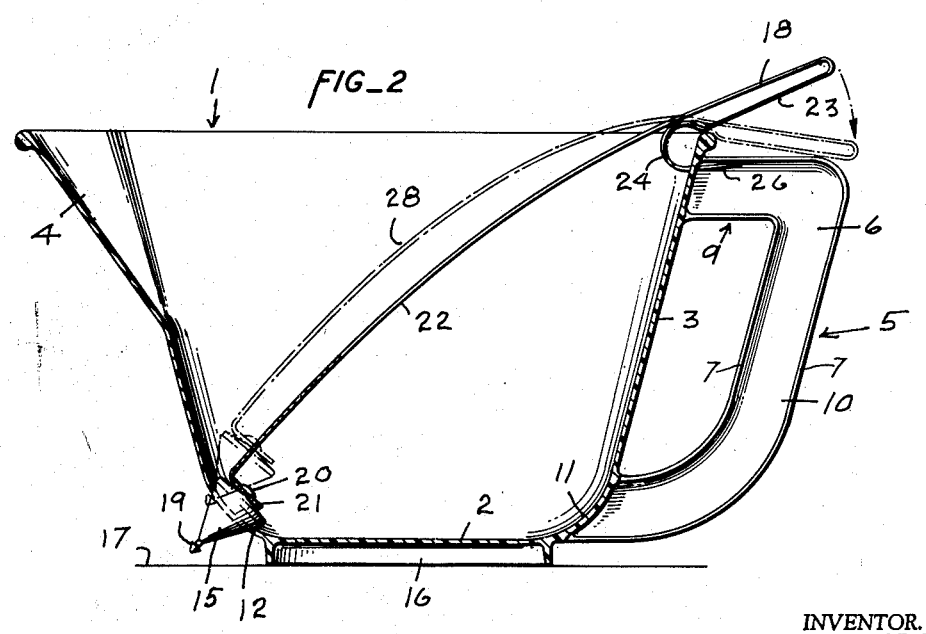
FIG_2
INVENTOR.
PERCY JEPSON
BY
Boykin, Mohler & Wood
ATTORNEYS

3,055,562
LIQUID SEPARATOR
Percy Jepson, Oakland, Calif., assignor to
Lloyd A. Wise, Berkeley, Calif.
Filed Oct. 19, 1960, Ser. No. 63,517
4 Claims. (Cl. 222—472)

This invention relates to a separator for liquids in which the liquid is discharged from the bottom or lower portion of the receptacle containing the same, as distinguished from pouring the liquid over a lip or upper edge.

One of the objects of the invention is the provision of a separator adapted to be used for separating liquids of different specific gravities in a body thereof in which such liquids have layered according to their specific gravities, such as in the instance where grease and water in a body thereof have separated into layers.

Another object of the invention is the provision of a dripless dispenser for liquids provided with means for accurately dispensing liquid from a receptacle without drippage.

A still further object of the invention is the provision of a receptacle for liquids having a discharge opening in the lower portion thereof, and a handle to be grasped by a hand of a person, and a finger actuated valve of simple, sanitary, economical, dependable construction that automatically closes the discharge opening and remains closed until actuated by a finger (preferably the thumb) of the hand that grasps the handle, and after release of the thumb the valve will automatically close, and which valve and its actuating means can be removed from the receptacle and replaced in a few seconds.

Other objects and advantages will appear in the description and in the drawings.

In the drawings, FIG. 1 is a top plan view of the dispenser.

FIG. 2 is a cross sectional view taken along line 2—2 of FIG. 1.

In detail, the dispenser comprises a receptacle 1 that is generally cup shaped, having a bottom wall 2 and upwardly divergently extending side walls 3. A pouring lip or spout 4 may project from one side wall at the upper edge of the receptacle, and a handle 5 projects from the side wall opposite to the pouring spout.

The above receptacle is preferably of plastic material commonly used for receptacles of the same construction as above described, and in which the handle 5 is generally of H shape in cross sectional contour having a web 6 and flanges 7 projecting from opposite edges of the web perpendicular thereto. Such handle connects with the upper portion of the side wall 3 at one end of a generally horizontally extending upper section 9 of the handle, and the main hand grasping section 10 of the handle extends downwardly from the outer end of section 9, spaced from wall 3, and which section 10 inclines forwardly at its lower end and connects with the lower end of the wall 3. Preferably, walls 3 and the bottom 2 join in a curved portion 11 that facilitates cleaning of the interior of the receptacle, and it is substantially in this portion 11 that a discharge opening 12 is formed (FIG. 2).

The discharge opening 12 is at the side of the receptacle opposite to that of handle 5, and it is circular in outline.

A conical valve member 15 is adapted to extend into opening 12 from inside the receptacle, with the apex end projecting to the outside of the receptacle when the valve member is seated against the edges of the opening.

The bottom of the receptacle has a base in the form of a downwardly projecting flange 16 integral with the bottom 2, which flange is adapted to support the receptacle elevated above a supporting surface 17 a distance adequate to hold the valve member spaced above such surface when the valve member is in closed position (FIG. 2).

The outer end of the valve member 15, at its apex, is formed with a slight enlargement 19, which enlargement will act as a stop to prevent accidental withdrawal of the member 15 completely out of the opening when the valve actuating means is used to move the valve to open position. This will be described more in detail later on.

A pivot 20 centrally positioned on the base end of member 15, coaxial with the latter, rotatably and rockingly connects the valve member with the lower end portion 21 of a flat, elongated, upwardly extending spring strip 22, that may be called a leaf spring. This lower end portion 21 is bent at right angles to the remainder of the spring in a direction projecting generally toward the bottom 2.

The upwardly extending central and main portion 22 of the leaf spring extends diagonally across the inside of the receptacle and across the upper edge of the receptacle to a point overlying the section 9 of the handle 5. The said upper end portion is designated 18.

A return bend is formed in the spring 22 at its uppermost end to provide a return portion 23 that extends between handle 5 and the upper end portion 18 of the spring to the upper edge of the receptacle where said portion 23 engages the upper edge and is arcuately curved as at 24 to extend inside the receptacle adjacent to the upper edge thereof.

The upper marginal portion of the side wall 3 of the receptacle is formed with a pair of horizontally aligned slots 25 (FIG. 1) at opposite sides of the web 6 of handle 5 where the section 9 of the handle joins the wall 3. The terminating end of the curved part 24 of the return bend 23 is forked to provide generally horizontally extending continuations 26 of portion 24 that extend through the slots 25 to straddle web 6.

When the valve member 15 is in tight sealing engagement with the edges of the opening 12 and the closed end of the slot 27 defined by continuations 26 is in engagement with web 6, the main section 22 of the leaf spring is bowed slightly, as indicated in FIG. 2 in full line, and is under tension yieldably urging the valve member to said closed position and in sealing engagement with the edges of the opening 12.

Upon the upper end 18 of the spring 22 being pressed downwardly toward the upper section 9 of the handle, the spring 22 will assume the dot-dash line position 28 (FIG. 2) further bowing the spring, and the valve member 15 will move to the open position fully opening the discharge aperture, except for the relatively insignificant end portion 19 which will engage the edge of the opening to prevent withdrawal of the valve member into the receptacle. During movement of the valve member 15 to open position, the slanted upper side of the member will slide against the upper edge of opening 12 so the valve member is never out of engagement with one edge of the opening, at least. This insures against the valve member being withdrawn into the receptacle, irrespective of the pressure against the upper end of spring 22. However, in normal practice, the return bend portion 23 of the spring also engages the handle, as seen in the dot-dash lines in FIG. 2 where the valve is opened, to prevent further movement.

The upper end portion of the spring 22 is positioned to be engaged by the thumb of the hand grasping the portion 10 of the handle.

In order to remove the spring 22 and valve from the receptacle, it is merely necessary to push the upper end of the spring generally toward the spout side of the receptacle so that the extensions 26 clear the slots 25 and the valve and all parts connected therewith will be free from the receptacle and can be cleaned or replaced.

As best seen in FIG. 2 when the upper end of the spring 22 is pressed down the spring fulcrums substantially about the upper edge of the receptacle.

One of the important results of the structure, as disclosed, is the fact that there is no drippage at the outlet when the valve is closed. Also the full closure can be effected instantly so that in a separation of liquids, the discharge can be stopped as soon as a lower layer of liquid of one specific gravity is discharged, leaving the liquid thereabove within the receptacle.

It is the intention that the claims appended hereto cover all changes and modifications of the example of the invention herein chosen for purposes of the disclosure, which do not constitute departures from the spirit and scope of the invention.

I claim:

1. In a receptacle for use in dispensing liquid, and which receptacle includes a horizontally disposed bottom wall; side walls extending upwardly from said bottom wall terminating in a free upper edge, and a handle rigid with and projecting laterally outwardly from one side wall for grasping by a handle, the improvement that comprises:
   (a) a discharge opening having an annular valve seat, formed in the side wall of said receptacle and at the side thereof opposite to said one side wall,
   (b) a valve element within said receptacle movable within the latter from a closed position seated against said valve seat, to a retracted open position within said receptacle spaced from said valve seat, and vice versa,
   (c) a substantially straight, elongated spring member secured at one end thereof to said valve element and extending diagonally upwardly from said valve element across the interior of said receptacle and transversely across and over the upper free edge of said one side wall and terminating in an upper end portion projecting past said one side wall and extending over and spaced above said handle,
   (d) connecting means on said spring member swingably connecting said member, including said upper end portion thereof with said one side wall for rocking said member and said upper end portion thereof about said one edge upon downward movement of said upper end portion, and for holding the length of said spring between said valve element and said upper free edge bowed slightly upwardly and under tension yieldably urging said valve element against said valve seat,
   (e) said upper end portion being in a position relative to said handle for engagement of its upper surface with the thumb of a hand grasping said handle for downward movement of said end position under downward pressure from said thumb and consequent upward movement of the lower end of said spring and movement of said valve element to said retracted open position, and
   (f) means on said valve element, extending through said opening and in movable engagement with an edge of the latter for guiding said valve element between said open and closed positions.

2. The structure as defined in claim 1, including:
   (g) said connecting means comprising an extension of said upper end portion positioned below the latter and extending across said upper edge of said one side wall,
   (h) a return bend of said upper end portion at its outermost end integrally connecting said extension with said upper end portion, and
   (i) said extension having an arcuate continuation thereof in swingable and retractable engagement with said one side wall at said upper free edge thereof.

3. The structure as defined in claim 2 in which:
   (j) said spring member, upper end portion thereof, return bend, extension and arcuate continuation are formed from a single flat sided strip of spring material bent perpendicular of its flat sides to form said return bend and said arcuate continuation.

4. The structure as defined in claim 3 that includes:
   (k) an opening formed in said one side wall adjacent to said upper free edge,
   (l) said arcuate extension over said upper free edge of said one side wall and then removably through said last-mentioned opening from the inside of said receptacle, whereby the tension of said spring member will yieldably hold said arcuate extension in a position extending into said last-mentioned opening.

References Cited in the file of this patent

UNITED STATES PATENTS

| | | |
|---|---|---|
| 583,615 | Borcher | June 1, 1897 |
| 2,150,152 | Campbell | Mar. 14, 1939 |
| 2,765,105 | Sullivan | Oct. 2, 1956 |

FOREIGN PATENTS

| | | |
|---|---|---|
| 656,296 | France | Jan. 2, 1929 |